(12) United States Patent
Kim

(10) Patent No.: US 9,058,476 B2
(45) Date of Patent: Jun. 16, 2015

(54) METHOD AND IMAGE FORMING APPARATUS TO AUTHENTICATE USER BY USING SMART CARD

(75) Inventor: Byoung-yue Kim, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 324 days.

(21) Appl. No.: 13/248,195

(22) Filed: Sep. 29, 2011

(65) Prior Publication Data

US 2012/0080519 A1    Apr. 5, 2012

(30) Foreign Application Priority Data

Sep. 30, 2010    (KR) .................. 10-2010-0095477

(51) Int. Cl.
*G06F 21/00* (2013.01)
*G06F 21/34* (2013.01)
*G06F 21/84* (2013.01)

(52) U.S. Cl.
CPC .............. *G06F 21/34* (2013.01); *G06F 21/84* (2013.01); *G06F 2221/2137* (2013.01)

(58) Field of Classification Search
USPC ........................................... 235/492
See application file for complete search history.

(56) References Cited

U.S. PATENT DOCUMENTS

| 2009/0007232 A1* | 1/2009 | Kasatani ............... 726/2 |
| 2010/0205449 A1* | 8/2010 | Eun et al. ............. 713/185 |

FOREIGN PATENT DOCUMENTS

JP          10-79733          3/1998

* cited by examiner

*Primary Examiner* — Christopher Stanford
(74) *Attorney, Agent, or Firm* — Staas & Halsey LLP

(57) ABSTRACT

A method and an image forming apparatus authenticate a user by using a smart card. The image forming apparatus includes a card reader to, if a smart card is inserted, extract user information from the smart card, an input unit to input information required for user authentication, a storage unit to store the input information in correspondence with the extracted user information, a user account management unit to request to authenticate the user of the smart card based on the extracted user information and the input information, or the extracted user information and the stored information, and a user authentication unit to authenticate the user according to the authentication request.

23 Claims, 4 Drawing Sheets

| ID (410) | PASSWORD (420) | PASSWORD STORING PERIOD (430) | LAST AUTHENTICATION TIME (440) |
|---|---|---|---|
| User1 | ****** | 10 MINUTES | 2010-06-16 14:20:33 |
| User2 | **** | 30 MINUTES | 2010-06-16 14:20:33 |
| . . . | . . . | . . . |  |

FIG. 2
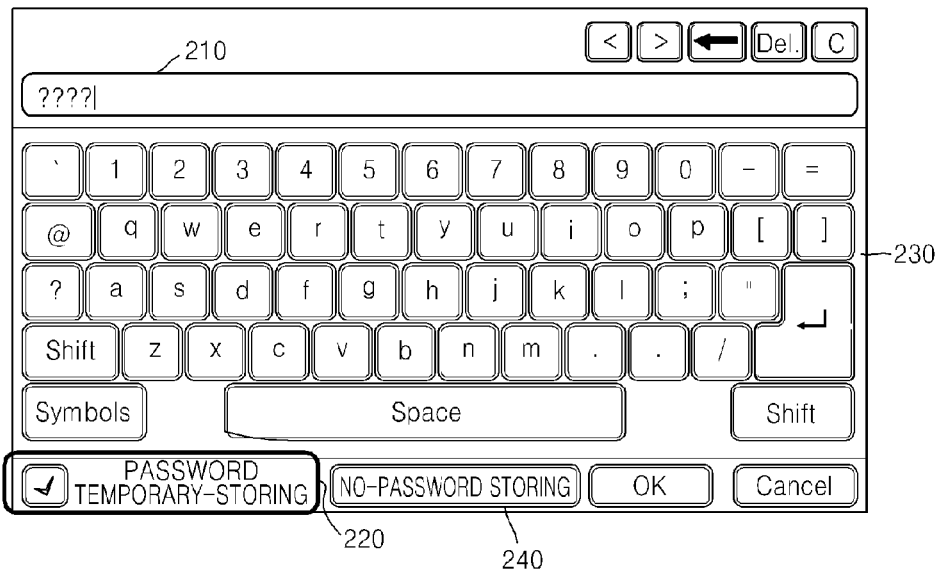
FIG. 3
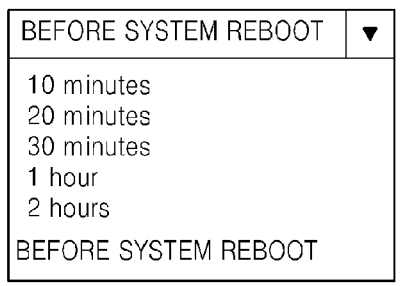
FIG. 4
| ID (410) | PASSWORD (420) | PASSWORD STORING PERIOD (430) | LAST AUTHENTICATION TIME (440) |
|---|---|---|---|
| User1 | ****** | 10 MINUTES | 2010-06-16 14:20:33 |
| User2 | **** | 30 MINUTES | 2010-06-16 14:20:33 |
| . . . | . . . | . . . | |

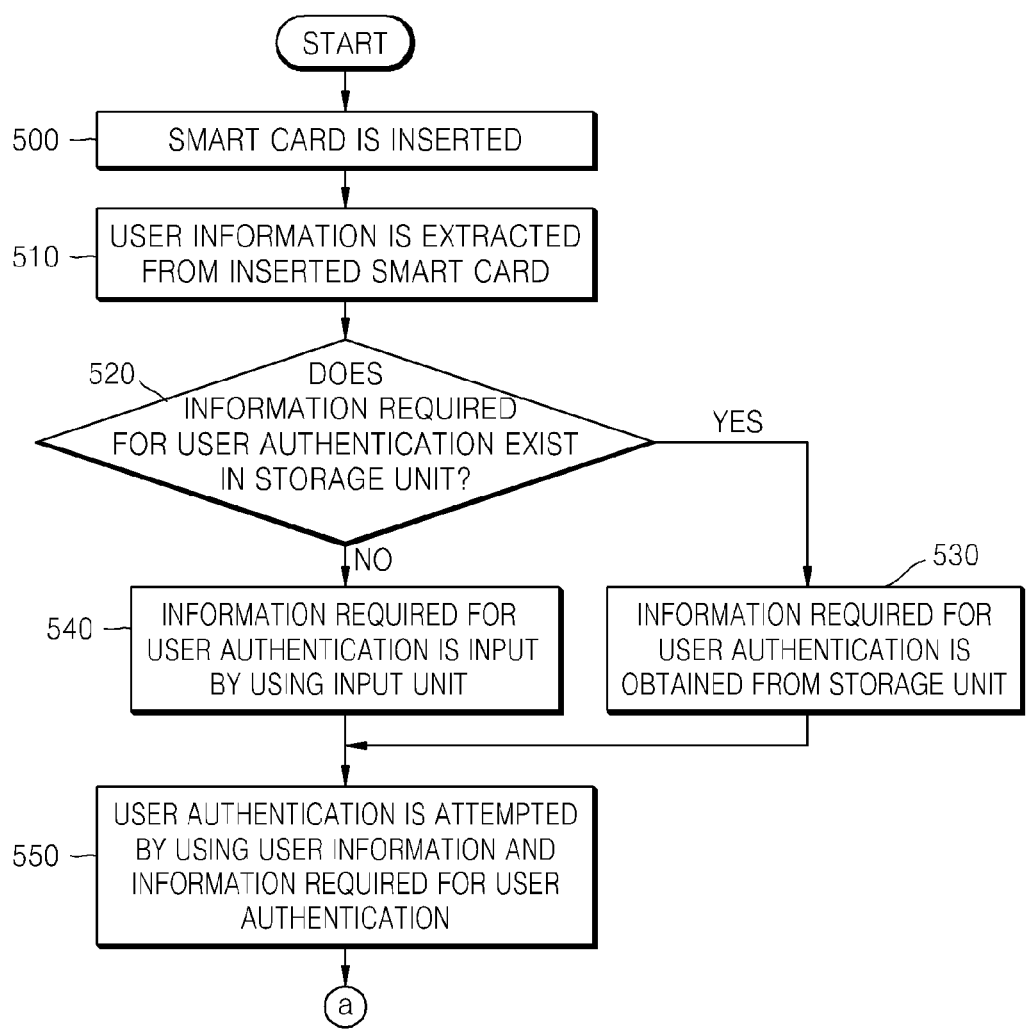

METHOD AND IMAGE FORMING APPARATUS TO AUTHENTICATE USER BY USING SMART CARD

CROSS-REFERENCE TO RELATED APPLICATIONS

This application claims priority under 35 U.S.C. §119 from Korean Patent Application No. 10-2010-0095477, filed on Sep. 30, 2010, in the Korean Intellectual Property Office, the disclosure of which is incorporated herein in its entirety by reference.

BACKGROUND OF THE INVENTION

1. Field of the Invention

The present general inventive concept relates to a method and an image forming apparatus to authenticate a user by using a smart card.

2. Description of the Related Art

Since security problems frequently occur in printing systems these days, in many cases, an image forming apparatus performs user authentication to allow a user to log in and to use a function of the image forming apparatus. One of various methods of performing user authentication in an image forming apparatus to allow a user to log in is a method using a physical identification means such as a smart card to allow a user to log in. In this case, the smart card is inserted into the image forming apparatus, information required for user authentication, e.g., a password, is input to authenticate a user and to allow the user to log in, and the logged-in user may use a function of the image forming apparatus. Also, after the function of the image forming apparatus is used, the inserted smart card is removed to allow the user to log out. If a user is authenticated by using a smart card, as described above, smart card insertion and password inputting procedures have to be repeated whenever the user uses an image forming apparatus. If the user frequently uses the image forming apparatus, the user may be inconvenienced due to repeating the authentication procedures. However, the authentication procedures are required for security and thus may not be omitted. Accordingly, a solution for maintaining security and providing convenience to a user of an image forming apparatus is required.

SUMMARY OF THE INVENTION

The present general inventive concept provides a method and an image forming apparatus to authenticate a user by using a smart card to maintain security and to increase a user convenience.

Additional aspects and advantages of the present general inventive concept will be set forth in part in the description which follows and, in part, will be obvious from the description, or may be learned by practice of the general inventive concept.

The foregoing and/or other aspects and utilities of the present general inventive concept may be achieved by providing an image forming apparatus including a card reader to extract user information from the smart card, an input unit to input information required for user authentication, a storage unit to store the input information in correspondence with the extracted user information, a user account management unit to request to authenticate the user of the smart card based on the extracted user information and the input information, or the extracted user information and the stored information, and a user authentication unit to authenticate the user according to the authentication request.

The foregoing and/or other aspects and utilities of the present general inventive concept may also be achieved by providing a method of authenticating a user by using a smart card, the method including extracting user information from the smart card, determining whether information required for user authentication is stored, if the information is stored, requesting to authenticate the user of the smart card based on the extracted user information and the stored information, and authenticating the user according to the authentication request.

The foregoing and/or other aspects and utilities of the present general inventive concept may also be achieved by providing an image forming apparatus to authenticate a user by using a smart card, the image forming apparatus including a card reader to receive user information of a user from a smart card of the user, and a control unit to perform a first operation to allow a user to access the image forming apparatus using the received user information and reference information, to perform a second operation to authenticate the user using newly input information and second reference information corresponding the received user information to use a function of the image forming apparatus if there is no previously input information set in a previous second operation, and to authenticate the user to use a function of the image forming apparatus without performing the second operation, using the previously input information and the second reference information if there is the previous input information set in the previous second operation.

The control unit may authenticate the user without performing the second operation whenever the card reader re-communicates with the smart card, if there is the previous information set in the previous second operation.

The image forming apparatus may further include a function performing unit to perform the function of the image forming apparatus according to the authentication, and a user interface unit to display a user interface screen to set an option to store for previous input information set in the previous second operation, and to display a function screen corresponding to the function of the function performing unit according to the authentication.

The user interface screen may include a key to change the option, and the function screen may include another key to change the function screen to the user interface screen.

BRIEF DESCRIPTION OF THE DRAWINGS

The above and other features and advantages of the present general inventive concept will become more apparent by describing in detail exemplary embodiments thereof with reference to the attached drawings in which:

FIG. 2 is a view illustrating an image of a user interface screen to input a password in the image forming apparatus of FIG. 1A or 1B according to an embodiment of the present general inventive concept;

FIG. 3 is an image of a user interface screen to select a password storing period, according to an embodiment of the present general inventive concept;

FIG. 4 is a password temporary-storing table stored in a storage unit illustrated in FIG. 1A or 1B, according to an embodiment of the present general inventive concept; and FIGS. 5A and 5B are flowcharts of a method of authenticating a user by using a smart card, according to an embodiment of the present general inventive concept.

DETAILED DESCRIPTION OF THE PREFERRED EMBODIMENTS

Figure 1A:
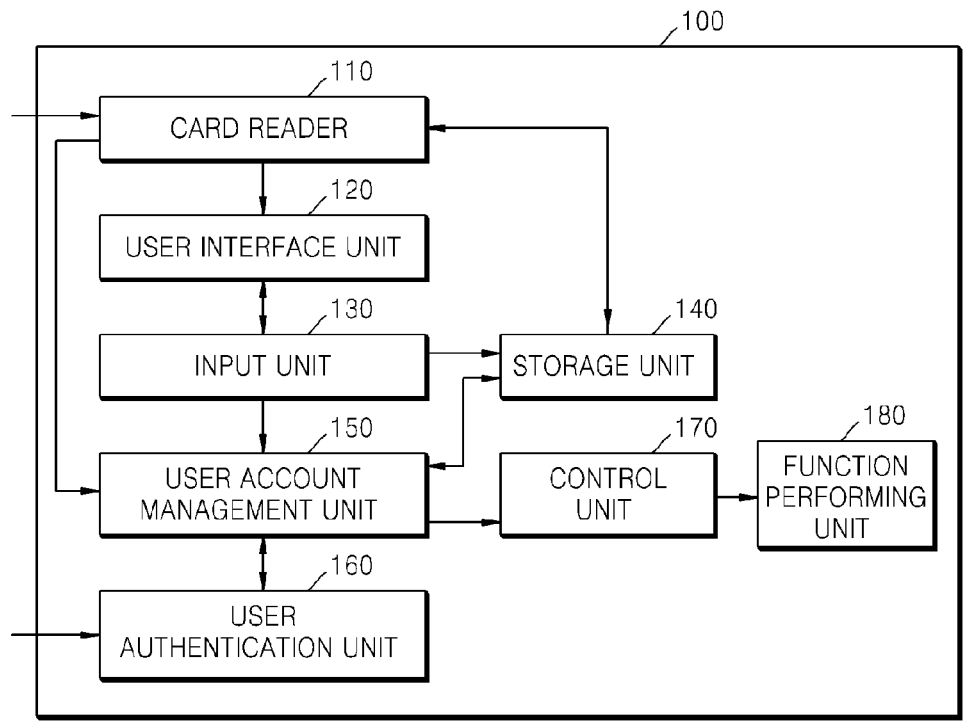
FIGS. 1A and 1B are block diagrams illustrating an image forming apparatus to authenticate a user by using a smart card, according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

Figure 1B:
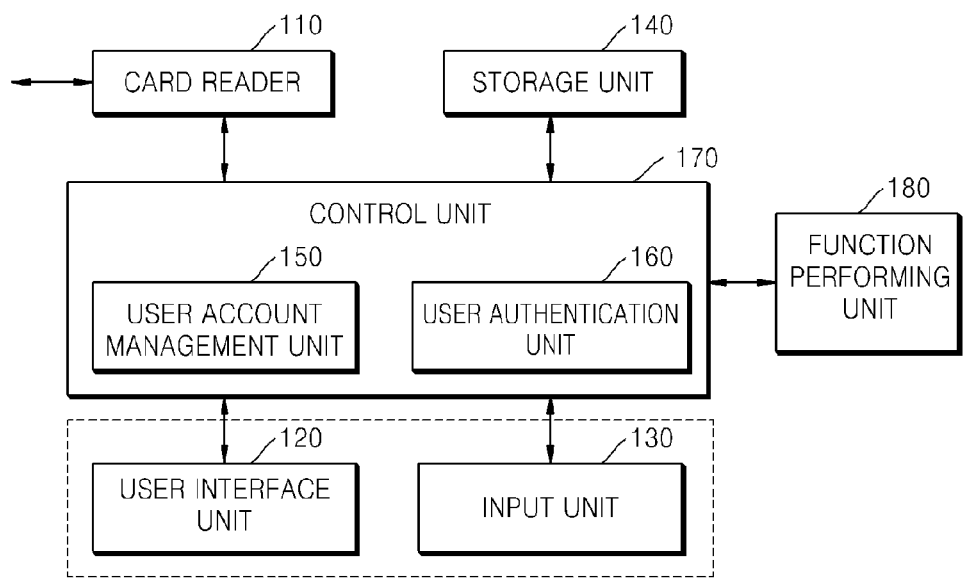

FIGS. 1A and 1B are block diagrams of an image forming apparatus 100 to authenticate a user by using a smart card, according to an embodiment of the present general inventive concept.

The image forming apparatus 100 includes a card reader 110, a user interface unit 120, an input unit 130, a storage unit 140, a user account management unit 150, a user authentication unit 160, a control unit 170, and a function performing unit 180.

If the smart card is inserted into the card reader 110, the card reader 110 senses the insertion of the smart card and extracts or receives user information from the inserted smart card. Here, the smart card is a card including user information. Also, the user information is information to identify the user and may include a user identification (ID). The card reader 110 searches the storage unit 140 for reference information, and checks whether the extracted user information represents that the user is allowed to access the image forming apparatus 100 according to the searched reference information. Also, the card reader 110 checks whether a valid password corresponding to the extracted user information exists in the storage unit 140. If the extracted user information represents that the user is allowed to access the image forming apparatus 100, and the valid password corresponding to the extracted user information does not exist in the storage unit 140, the card reader 110 outputs to the user interface unit 120 a signal representing that the user is access-allowed. Also, if the extracted user information represents that the user is allowed to access the image forming apparatus 100, and the valid password corresponding to the extracted user information exists in the storage unit 140, the card reader 110 outputs to the user account management unit 150 the signal representing that the user is access-allowed. Furthermore, if the extracted user information represents that the user is not allowed to access the image forming apparatus 100, the card reader 110 outputs to the user interface unit 120 a signal instructing output of a message representing that the user is not access-allowed.

According to comparison between the extracted user information and the searched reference information, it is determined that the user having the smart card is allowed to access the image forming apparatus 100 in a first operation. However, when the extracted user information does not match the searched reference information, the user having the smart card is not allowed to access the image forming apparatus in the first operation. When the user having the smart card is allowed in the first operation, the image forming apparatus provides a second operation of authenticating the access-allowed user. When the user having the smart card is not allowed to access the image forming apparatus, the image forming apparatus does not provide the second operation of authenticating the user.

Although FIG. 1A illustrates the card reader 110 and the smart card to be inserted into the card reader 110 such that the user information is extracted, it is possible that the smart card does not have to be inserted into the card reader 110. The card reader 110 may communicate with the smart card using a wireless communication without the insertion of the smart card into the card reader 110. In this case, the card reader 110 may have a wireless communication interface to receive the user information from the smart card when a distant wireless communication is provided between the card reader 110 and the smart card or when the smart card is spaced apart from the card reader 110 by a distance where the card reader 110 can detect the smart card and where the smart card can transmit the user information to the card reader 110.

The user interface unit 120 receives the signal from the card reader 110, and displays a message on a user interface screen thereof according to the received signal. If the signal representing that the user is access-allowed is received from the card reader 110, the user interface unit 120 displays a user interface screen to input a password. Here, the user interface screen is a screen to input a password required to authenticate the user allowed to access the image forming apparatus 100. On the other hand, if the signal representing that the user is not access-allowed is received from the card reader 110, the user interface unit 120 displays a message representing that the user is not authenticated.

Referring to FIG. 1B, the control unit 170 may include the user account management unit 150 and the user authentication unit 160 and may communicate with the card reader 110, the storage unit 140, the user interface unit 120, and the input unit 130 to perform the first operation of determining whether the user having the smart card is allowed to access the image forming apparatus 100 and the second operation of determining whether the user allowed to access the image forming apparatus 100 in the first operation is authenticated to operate one or more functions of the function performing unit 180 of the image forming apparatus 100.

FIG. 2 is an image of a user interface screen to input a password, according to an embodiment of the present general inventive concept. In FIG. 2, the user interface screen includes a password input field 210 to display the password to be input by touching characters displayed in the form of a keyboard.

The input unit 130 receives the password corresponding to user information via the user interface screen displayed on the user interface unit 120. The input unit 130 may be an input field 230, for example, a touchable keyboard, displayed on the user interface unit 120, or may be input buttons attached around the user interface unit 120 of the image forming apparatus 100. Although the password corresponding to the user information is stated above as information required for user authentication of the second operation, in addition to the password, another type of information required for user authentication may be further required to be input. For example, a personal identification number (PIN) code of the smart card may be required to be input. In this case, a user interface screen to input the PIN code may be additionally displayed on the user interface unit 120 to the password input field 210, and the PIN code may be additionally input by using the input unit 130.

The user interface unit 120 and the input unit 130 may be formed on a housing of the image forming apparatus 100 to display the user interface screen and the input screen to provide the message of the first operation and/or the input method of the second operation. It is possible that the user interface unit 120 and the input unit 130 may be connected to the user account manage unit 150 or the control unit 170 through a wired or wireless communication. In this case, the user interface unit 120 and the input unit 130 may have a wired or wireless communication interface, and the image forming apparatus 100 may have another wired or wireless communication interface disposed in the user account manage unit 150 or the control unit 170.

If the user interface screen illustrated in FIG. 2 is displayed on the user interface unit 120, the password corresponding to the user information may be input on the user interface screen by using the input unit 130. In this case, a "password temporary-storing" option 220 regarding the password input on the user interface screen may be selected. The "password temporary-storing" option 220 is an option to store the input password not permanently but for only a preset period in the image forming apparatus 100. Accordingly, if the "password temporary-storing" option 220 is selected, a user interface screen to select a password storing period is displayed on the user interface unit 120.

The user interface screen of the user interface unit 120 or the input unit 130 may include a no password storing option 240 to prevent the input password from being stored for a period of time or to return from the password temporary storing option 220 to the no password storing option 240.

When the password temporary-storing option 220 is selected and then the input password is stored, the user who is allowed to access the image forming apparatus 100 in a next first operation may be automatically authenticated using the temporarily stored password and the user information without entering a password in a next second operation.

That is, when a user has previously selected the password temporary-storing option 220 in the previous second operation, the user may be allowed to access the image forming apparatus 100 by using the smart card and then authenticated to use the functions thereof using the temporarily stored password.

The authentication is maintained until the user terminates or logs out the image forming apparatus 100, or completes one or more selected function of the image forming apparatus 100. Once the authentication is not maintained, the user may re-use the smart card to get the access and authentication to use the function thereof. Therefore, the user who has previously selected the password temporary-storing" option does not have to enter a password to be authenticated when the user wants to use the function of the image forming apparatus 100. In this case, the user is required to provide communication between the smart card and the card reader 110 to be authenticated.

FIG. 3 is an image of a user interface screen to select a password storing period, according to an embodiment of the present general inventive concept. As illustrated in FIG. 3, the password storing period may be variously set. The password storing period is a period in which a security problem does not occur even if the stored password is reused, and may be set as "10 minutes", "20 minutes", "30 minutes", "1 hour", "2 hours", or "before system reboot", as illustrated in FIG. 3.

The storage unit 140 stores the input password in correspondence with the user information extracted from the smart card. Here, the storage unit 140 stores the input password for the period set on the user interface screen illustrated in FIG. 3 only when the "password temporary-storing" option 220 is selected on the user interface screen illustrated in FIG. 2 to activate a "password temporary-storing" function. Also, the storage unit 140 stores the input password if the input password is successfully authenticated. Furthermore, if the PIN code of the smart card is required in addition to the password, as the information required for user authentication, the storage unit 140 may store the PIN code in the same manner as the password.

When the user has previously selected the password temporary storing option 220, the user is not required to enter a password in the password input field 210 in a next access to the image forming apparatus 100. In this case, the user interface screen may be displayed for a period of time for the user to select the no password storing option 240 or change an old password to a new password according to a function key (not illustrated) displayed in the user interface screen. It is possible that the user can use the function of the image forming apparatus 100 regardless of the display of the user interface screen. It is possible that the user interface screen may be changed to a function screen to show the functions of the function performing unit 180 after a preset period of time.

It is also possible that the user interface screen is not displayed for the authentication of the second operation, and the function screen includes a function key displayed on the user interface unit 120 and/or the input unit 130 so that a user can select to display the user interface screen of FIG. 2 to change the options, etc. After the user interface screen is displayed or the option is changed. It is possible that the user interface screen is changed to the function screen so that the user continues to use the function thereof or terminate the use of the image forming apparatus 100.

The user interface screen of FIG. 2 and the function screen may be displayed in a single unit, for example, the user interface unit 120 and/or the input unit 130 disposed at a same location of the image forming apparatus 100. However, it is possible that the user interface screen of FIG. 2 and the function screen may be simultaneously displayed in different units disposed in different location of the image forming apparatus 100. It is also possible that user interface screen of FIG. 2 and the function screen may be simultaneously displayed in the single unit. In this case, a screen is divided into two sections for the user interface screen of FIG. 2 and the function screen.

FIG. 4 is a password temporary-storing table stored in the storage unit 140 illustrated in FIG. 1A or 1B, according to an embodiment of the present general inventive concept. As illustrated in FIG. 4, the storage unit 140 stores the password temporary-storing table storing a user ID corresponding to the user information, a password 420 in correspondence with the user ID 410, and a password storing period 430 and a last authentication time 440 in correspondence with the password 420. The password temporary-storing table may be updated whenever user authentication is performed and thus may store an updated password, an updated password storing period, and an updated authentication time.

The user account management unit 150 checks whether a valid password corresponding to the user information of the smart card exists in the storage unit 140. If the valid password corresponding to the user of the smart card does not exist in the storage unit 140, the user account management unit 150 requests the user authentication unit 160 to authenticate the user of the smart card based on the user information extracted from the smart card by using the card reader 110 and the password input to the password input field 210 by using the input unit 130. Otherwise, if the valid password corresponding to the user of the smart card exists in the storage unit 140, the user account management unit 150 requests the user authentication unit 160 to authenticate the user of the smart card based on the user information extracted by using the card reader 110 and the password stored in the storage unit 140. If the PIN code of the smart card is required to be input in addition to the password, as the information required for user authentication, the PIN code may be used in the same manner as the password.

The user authentication unit 160 authenticates the user of the smart card. In this case, the user authentication unit 160 authenticates the user of the smart card by using a user database including IDs and passwords of login allowed users. If an ID and a password of the user of the smart card correspond to those of the user database, the user authentication unit 160 determines the user as a login allowed user in the first operation, and authenticates the user in the second operation. In this case, the user database may be located in the user authentication unit 160 or an external server. If the user database is located in the external server, the user is authenticated by using a user database located in the external server. The user authentication unit 160 transmits the authentication result to the user account management unit 150.

The user account management unit 150 receives the authentication result, updates the password stored in the storage unit 140, and the user is allowed to log in to use the function of the image forming apparatus 100. Also, the user account management unit 150 transmits the authentication result to the control unit 170.

The control unit 170 receives the authentication result from the user account management unit 150, and outputs a control signal indicating to perform a function allowed to the authenticated user to control the function performing unit 180. Also, the control unit 170 outputs control signals to other elements included in the image forming apparatus 100 to control overall operations of the image forming apparatus 100.

The function performing unit 180 performs a function corresponding to the control signal output from the control unit 170. The function performing unit 180 may perform a scan data generation function, a printing function, a fax data transmission function, or a data transmission function to an external device, according to the control signal output from the control unit 170. The function performing unit 180 may have a structure to perform the function thereof.

As described above, if the smart card is inserted into the card reader 110, and user authentication is performed to allow login of the user, the user may use a desired function of the image forming apparatus 100. Also, if the inserted smart card is removed, the user is logged out. After that, if the smart card is re-inserted, since the storage unit 140 stores the password for the preset period, the user may be authenticated without re-inputting the password during the preset period, and thus may use a desired function of the image forming apparatus 100.

Figure 5B:
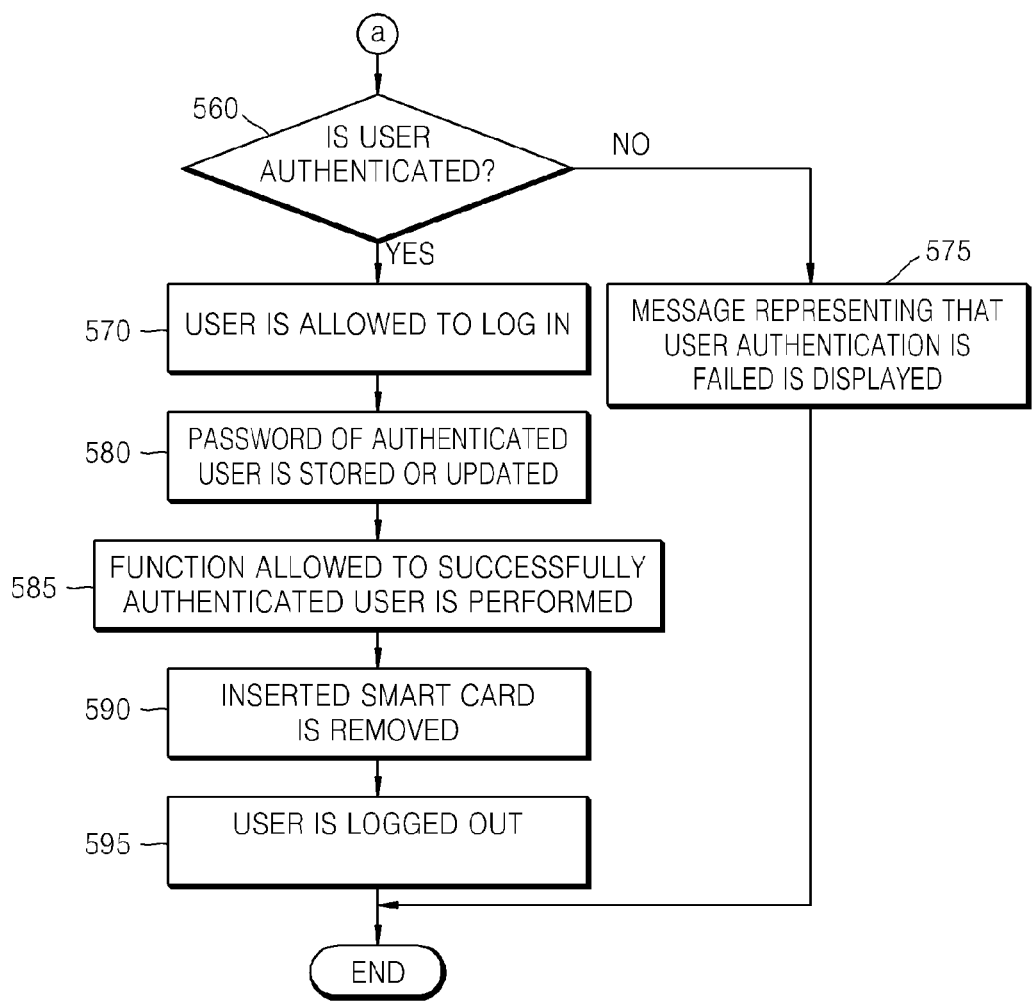

FIGS. 5A and 5B are flowcharts of a method of authenticating a user by using a smart card, according to an embodiment of the present general inventive concept. The method will be described in conjunction with the image forming apparatus 100 illustrated in FIG. 1A or 1B.

In operation 500, a smart card is inserted. The smart card is inserted into an image forming apparatus 100 to perform user authentication. Here, the smart card is a card including user information.

In operation 510, the user information is extracted or received from the inserted smart card. Here, the user information is information to identify the user and may include a user ID. Also, the user information may be extracted or received from the smart card by using a card reader of the image forming apparatus.

In operation 520, it is checked whether information required for user authentication exists in a storage unit. If user authentication is performed by using the smart card, the information required for user authentication may be a password corresponding to the user information. Accordingly, it is checked whether a valid password corresponding to the user information exists in the storage unit. Also, a PIN code of the smart card may be required, in addition to the password, as the information required for user authentication. Accordingly, if the PIN code is required for user authentication, it is checked whether the password and the PIN code exist in the storage unit. If the information required for user authentication exits in the storage unit, the method proceeds to operation 530. Otherwise, if the information required for user authentication does not exist in the storage unit, the method proceeds to operation 540.

In operation 530, the information required for user authentication is obtained from the storage unit. If the information required for user authentication includes the password, the password is obtained from the storage unit. Otherwise, if the information required for user authentication includes the password and the PIN code of the smart card, the password and the PIN code are obtained from the storage unit.

In operation 540, the information required for user authentication is input by using an input unit. If the information required for user authentication includes the password, the password is input by using the input unit. Otherwise, if the information required for user authentication includes the password and the PIN code of the smart card, the password and the PIN code are input by using the input unit.

In operation 550, user authentication is attempted by using the user information and the information required for user authentication. User authentication is performed by using the user information extracted from the smart card and the information required for user authentication, which is input by using the input unit or obtained from the storage unit. Here, the information required for user authentication may include the password or the password and the PIN code.

In operation 560, it is determined whether the user is authenticated. Whether the user is authenticated may be determined according to whether information stored in a user database to perform user authentication, and the user information, and the information required for user authentication correspond to each other. In this case, the user database may be located in the image forming apparatus or an external server outside the image forming apparatus. If it is determined that the user is authenticated, the method proceeds to operation 570. Otherwise, if it is determined that the user is not authenticated, the method proceeds to operation 575.

In operation 570, the user is allowed to log in. The user of the smart card inserted into the image forming apparatus is allowed to log in.

In operation 575, a message representing that user authentication is failed is displayed.

In operation 580, the password of the authenticated user is stored or updated. After the user is authenticated, if the password of the authenticated user is not stored in the storage unit, the password is stored in the storage unit. Otherwise, if the password of the authenticated user is stored in the storage unit, the stored password is updated. The storing and updating of the password are described above in relation to FIGS. 2 through 4.

In operation 585, a function allowed to the successfully authenticated user is performed.

In operation 590, the inserted smart card is removed.

In operation 595, the user is logged out. If the removal of the inserted smart card is sensed, the logged-in user is logged out.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

While the present general inventive concept has been particularly shown and described with reference to exemplary embodiments thereof, it will be understood by one of ordinary skill in the art that various changes in form and details may be made therein without departing from the spirit and scope of the general inventive concept as defined by the following claims. The exemplary embodiments should be considered in a descriptive sense only and not for purposes of limitation. Therefore, the scope of the general inventive concept is defined not by the detailed description of the general inventive concept but by the following claims, and all differences within the scope will be construed as being included in the present general inventive concept.

What is claimed is:

1. An image forming apparatus to authenticate a user by using a smart card, the image forming apparatus comprising:
   a card reader to extract user information from the smart card;
   a user interface unit displaying a user interface including a password temporary-storing option which allows the user to select a password storing period of time;
   an input unit to receive input information required for user authentication, the input information comprising user selectable password temporary-storing information including the password storing period of time input by the user;
   a storage unit to store the input information in correspondence with the extracted user information;
   a user account management unit to request to authenticate the user of the smart card based on the extracted user information and the input information, or the extracted user information and the stored information; and
   a user authentication unit to authenticate the user according to the authentication request.

2. The image forming apparatus of claim 1, wherein the input information required for user authentication comprises a password corresponding to the user information.

3. The image forming apparatus of claim 1, wherein the information required for user authentication comprises a personal identification number (PIN) code of the smart card and a password corresponding to the user information.

4. The image forming apparatus of claim 1, wherein the user interface unit displays a user interface screen to select a period in which the input information is stored, and
   wherein the storage unit stores the input information for the period selected on the user interface screen.

5. The image forming apparatus of claim 1, wherein, if valid information exists in the storage unit, the user account management unit requests to authenticate the user of the smart card based on the extracted user information and the stored information.

6. The image forming apparatus of claim 1, wherein, if valid information does not exist in the storage unit, the user account management unit requests to authenticate the user of the smart card based on the extracted user information and the input information.

7. The image forming apparatus of claim 1, wherein, if the temporary-storing option is set to the input information, the storage unit stores the input information.

8. The image forming apparatus of claim 1, wherein the storage unit stores the input information in correspondence with the extracted user information, an information storing period, and a last authentication time.

9. The image forming apparatus of claim 1, wherein, if the user authentication unit authenticates the user, the storage unit updates the information stored in the storage unit by using the information which has been used to authenticate the user.

10. The image forming apparatus of claim 1, wherein:
    the user authentication unit authenticates the user by using a user database comprising identifications (IDs) and information required for user authentication of login-allowed users; and
    the user database is located in the user authentication unit or an external server outside the image forming apparatus.

11. A method of authenticating a user by using a smart card, the method comprising:
    extracting user information from the smart card;
    displaying a user interface screen to allow a user to select a password storing period of time;
    determining whether information required for user authentication is stored, the information required for user authentication comprising user selectable password temporary-storing information including the password storing period of time previously set by the user;
    if the information is stored, requesting to authenticate the user of the smart card based on the extracted user information and the stored information; and
    authenticating the user according to the authentication request.

12. The method of claim 11, further comprising:
    if it is determined that the information is not stored, receiving the information input by the user,
    wherein the requesting comprises requesting to authenticate the user of the smart card based on the extracted user information and the input information.

13. The method of claim 12, further comprising storing the input information.

14. The method of claim 13, further comprising:
    displaying the user interface screen for selecting a period in which the input information is stored; and
    selecting the period on the displayed user interface screen,
    wherein the storing comprises storing the input information for the selected period.

15. The method of claim 13, further comprising:
    if the user is authenticated, updating the stored information by using the information used to authenticate the user.

16. The method of claim 11, wherein the information required for user authentication comprises a password corresponding to the user information.

17. The method of claim 11, wherein the information required for user authentication comprises a personal identification number (PIN) code of the smart card and a password corresponding to the user information.

18. The method of claim 11, wherein:
the authenticating comprises authenticating the user by using a user database comprising identifications (IDs) and information required for user authentication of login-allowed users; and
the user database is located in a user authentication unit or an external server outside an image forming apparatus.

19. An image forming apparatus to authenticate a user by using a smart card, the image forming apparatus comprising:
a card reader to receive user information of the user from the smart card of the user;
a user interface unit displaying a user interface including a password temporary storing option which allows the user to select a password storing period of time; and
a control unit to perform a first operation to allow the user to access the image forming apparatus using the received user information and first reference information, and to selectively perform a second operation based on whether information has been previously input in a previous second operation,
wherein if information has not been previously input in a previous second operation, the control unit is configured to perform a second operation to authenticate the user using newly input information and second reference information corresponding to the received user information to use a function of the image forming apparatus, and
if information has been previously input in a previous second operation, the control unit is configured to authenticate the user to use a function of the image forming apparatus without performing the second operation, using the previously input information and second reference information,
wherein the previously input and newly input information each comprise user-selectable password information storing the password storing period of time previously set by the user and adjustable by the user.

20. The image forming apparatus of claim 19, wherein the control unit authenticates the user without performing the second operation whenever the card reader re-communicates with the smart card, if there is the previous information set in the previous second operation.

21. The image forming apparatus of claim 19, further comprising:
a function performing unit to perform the function of the image forming apparatus according to the authentication, wherein the
user interface unit displays a user interface screen to set an option to store for previous input information set in the previous second operation, and to display a function screen corresponding to the function of the function performing unit according to the authentication.

22. The image forming apparatus of claim 21, wherein:
the user interface screen includes a key to change the option; and
the function screen includes another key to change the function screen to the user interface screen.

23. An image forming apparatus to authenticate a user by using a smart card, the image forming apparatus comprising:
a card reader to receive user information of the user from the smart card of the user; and
a control unit to perform a first operation to allow the user to access the image forming apparatus using the received user information and first reference information, and to selectively perform a second operation based on whether information has been previously input in a previous second operation,
wherein if information has not been previously input in a previous second operation, the control unit is configured to perform a second operation to authenticate the user using newly input information and second reference information corresponding to the received user information to use a function of the image forming apparatus, and
if information has been previously input in a previous second operation, the control unit is configured to authenticate the user to use a function of the image forming apparatus without performing the second operation, using the previously input information and the second reference information, and
wherein the previously input and newly input information each comprise user-selectable password information storing a password storing period of time adjustable by the user.

* * * * *

UNITED STATES PATENT AND TRADEMARK OFFICE
CERTIFICATE OF CORRECTION

PATENT NO.        : 9,058,476 B2                                    Page 1 of 1
APPLICATION NO.   : 13/248195
DATED             : June 16, 2015
INVENTOR(S)       : Byoung-yue Kim It is certified that error appears in the above-identified patent and that said Letters Patent is hereby corrected as shown below:

IN THE CLAIMS

Col. 11, line 14, claim 19, after "password" delete "temporary".

Col. 12, line 37, claim 23, before "second" delete "the".

Signed and Sealed this
Thirteenth Day of October, 2015

Michelle K. Lee
*Director of the United States Patent and Trademark Office*